(12) United States Patent
Haserodt et al.

(10) Patent No.: US 11,888,928 B2
(45) Date of Patent: Jan. 30, 2024

(54) CALL AND MEDIA PRESERVING FAILOVERS IN A CLOUD ENVIRONMENT

(71) Applicant: Avaya Management L.P., Durham, NC (US)

(72) Inventors: Kurt Haserodt, Westminster, CO (US); Philipp Schubert, Livingston, TX (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/721,606

(22) Filed: Apr. 15, 2022

(65) Prior Publication Data

US 2023/0336621 A1    Oct. 19, 2023

(51) Int. Cl.
*H04L 67/1008* (2022.01)
*H04L 41/0668* (2022.01)
*H04L 43/0817* (2022.01)
*H04L 43/0876* (2022.01)

(52) U.S. Cl.
CPC ...... *H04L 67/1008* (2013.01); *H04L 41/0668* (2013.01); *H04L 43/0817* (2013.01); *H04L 43/0876* (2013.01)

(58) Field of Classification Search
CPC ............. H04L 67/1008; H04L 41/0668; H04L 43/0817; H04L 43/0876

USPC ......................................................... 709/226
See application file for complete search history.

(56) References Cited

U.S. PATENT DOCUMENTS

| | | | |
|---|---|---|---|
| 2004/0243650 A1* | 12/2004 | McCrory | G06F 9/5061 707/999.203 |
| 2012/0151248 A1* | 6/2012 | Bower, III | G06F 1/3203 714/E11.073 |
| 2017/0054843 A1* | 2/2017 | Ezell | H04M 3/4872 |
| 2018/0077007 A1* | 3/2018 | Olson | G06F 11/2097 |
| 2018/0143885 A1* | 5/2018 | Dong | G06F 11/1471 |
| 2021/0314390 A1* | 10/2021 | Derome | H04L 67/1004 |
| 2022/0027215 A1* | 1/2022 | Chilamakuri | G06F 9/5027 |

* cited by examiner

*Primary Examiner* — Meng Vang
(74) *Attorney, Agent, or Firm* — Sheridan Ross P.C.

(57) ABSTRACT

Embodiments of the disclosure provide systems and methods for performing a rapid failover in a cloud-based service with reduced interruption of ongoing communications. According to embodiments described herein, independent arbitration between servers can be used to indicate to a load balancer which of two or more servers should be considered the active one. This independent arbitration makes better state of health assessments than simple server failure. The load balancer can be explicitly controlled in this case. The health of individual containers, the completeness of the shadowed state as well as server health itself can be factored into the decision to make one server active over the other.

20 Claims, 6 Drawing Sheets

CALL AND MEDIA PRESERVING FAILOVERS IN A CLOUD ENVIRONMENT

FIELD OF THE DISCLOSURE

Embodiments of the present disclosure relate generally to methods and systems for providing failover in a cloud-based service and more particularly to methods and systems for performing a rapid failover in a cloud-based service with reduced interruption of ongoing communications.

BACKGROUND

Contact Center as a Service (CCaaS) is a framework of applications executing on a set of servers accessible by one or more communications networks, i.e., "in the cloud," that provide a cloud-based contact center infrastructure to clients. Such platforms often use Internet Protocol (IP) address takeover with independent arbitration and memory state shadowing for active/standby high availability. For better routing decisions, these components serve a large number of calls from a single server. IP address takeover can be very slow in cloud platforms due to the lack of a true layer 2 network connection. As soon as a failover event occurs, callers supported by the CCaaS platform would suffer from the slow cloud platform IP address takeover method, resulting in a bad end user experience.

The normal solution for this is to use either a cloud load balancer or a secondary IP address that can be detached and attached through API calls. Load balancers work best for active/active applications which externalize their state. Externalized state is slower to re-load on a new server than memory shadowed state, leading to a larger disruption in service, especially when media playback is part of that service. As an alternative to a cloud load balancer, a secondary IP address can be moved through Application Program interface (API) calls between servers during a failover event. However, while this allows better control of traffic flow and doesn't require applications to externalize their state, API calls and execution are usually much slower and depend on responsiveness of the API service. Hence, there is a need for improved methods and systems for providing failover in a cloud-based service.

BRIEF SUMMARY

Embodiments of the disclosure provide systems and methods for performing a rapid failover in a cloud-based service with reduced interruption of ongoing communications. According to one embodiment, a method for performing a failover between a first server and a second server in a cloud-based environment can comprise executing, by the first server, one or more services in the cloud-based environment in an active mode and executing, by the second server, the one or more services in the cloud-based environment in a standby mode. While executing the one or more services in the cloud-based environment in the active mode, the first server can provide a health signal to the load balancer of the cloud-based environment indicating a healthy state for the first server. While executing the one or more services in the cloud-based environment in the standby mode, the second server can provide a health signal to the load balancer of the cloud-based environment indicating an unhealthy state for the second server.

The first server and the second server can further perform memory and state replication from the first server to the second server. An arbiter executed by the first server and an arbiter executed by the second server can also perform arbitration of one or more states between the first server and the second server. Based on the arbitration of the one or more states between the first server and the second server, the arbiter executed by the second server can detect a failure of the first server.

In response to detecting the failure of the first server, the second server can provide, to a load balancer of the cloud-based environment, a health status message providing a health status for the second server, wherein the health status message initiates a failover from the first server to the second server. In some cases, the second server can initiate an active mode warm-up process, in response to detecting the failure of the first server. Providing the health status message in response to detecting the failure of the first server can comprise providing a health status indicating a healthy status for the second server. The one or more services of the cloud-based environment can then be executed in the active mode by the second server.

According to another embodiment, a cloud-based environment can comprise a first server comprising a processor and a memory coupled with and readable by the processor of the first server and storing therein a set of instructions which, when executed by the processor of the first server, causes the processor of the first server to execute one or more services of the cloud-based environment in an active mode. The cloud-based environment can further comprise a second server communicatively coupled with the first server, the second server comprising a processor and a memory coupled with and readable by the processor of the second server and storing therein a set of instructions which, when executed by the processor of the second server, causes the second server to execute the one or more services of the cloud-based environment in a standby mode. The set of instructions stored in the memory of the first server can further cause the processor of the first server to, while executing the one or more services in the cloud-based environment in the active mode, provide a health signal to the load balancer of the cloud-based environment indicating a healthy state for the first server. The set of instructions stored in the memory of the second server can further cause the processor of the second server to, while executing the one or more services in the cloud-based environment in the standby mode, provide a health signal to the load balancer of the cloud-based environment indicating an unhealthy state for the second server.

The instructions stored in the memory of the first server and executed by the processor of the first server and the instructions stored in the memory of the second server and executed by the processor of the second server can further cause the processor of the first server and the processor of the second server, memory and state replication from the first server to the second server. The set of instructions stored in the memory of the first server can further causes the processor of the first server to execute an arbiter. Similarly, the set of instructions stored in the memory of the second server can further causes the processor of the second server to execute an arbiter. The arbiter executed by the processor of the first server and the arbiter executed by the processor of the second server can perform arbitration of one or more states between the first server and the second server.

The set of instructions stored in the memory of the second server and executed by the second processor of the second server can further cause the processor of the second server to detect, based on performing the arbitration of the one or more states between the first server and the second server, a failure of the first server, and in response to detecting the failure of the first server, provide, to a load balancer of the cloud-based environment, a health status message providing a health status for the second server, wherein the health status message initiates a failover from the first server to the second server. Providing, by the second server, to a load balancer of the cloud-based environment, the health status message in response to detecting the failure of the first server can comprise providing a health status indicating a healthy status for the second server. In some cases, the set of instructions stored in the memory of the second server further cause the processor of the second server to initiate an active mode warm-up process in response to detecting the failure of the first server. The set of instructions stored in the memory of the second server can further cause the processor of the second server to then execute the one or more services of the cloud-based environment in the active mode in response to detecting the failure of the first server.

According to yet another embodiment, a non-transitory, computer-readable medium can comprise a set of instructions stored therein which, when executed by one or more processors, causes the one or more processors to perform a failover between a first server and a second server in a cloud-based environment by executing, by a first server of a cloud-based environment, one or more services in the cloud-based environment in an active mode and executing, by a second server of the cloud-based environment, the one or more services in the cloud-based environment in a standby mode. The instructions can further cause the one or more processors to, while executing, by the first server, the one or more services in the cloud-based environment in the active mode, provide, by the first server, a health signal to the load balancer of the cloud-based environment indicating a healthy state for the first server and while executing, by the second server, the one or more services in the cloud-based environment in the standby mode, provide, by the second server, a health signal to the load balancer of the cloud-based environment indicating an unhealthy state for the second server.

The instructions can further cause the one or more processors to perform, by the first server and the second server, memory and state replication from the first server to the second server. The instructions can further cause the one or more processors to perform, by an arbiter executed by the first server and an arbiter executed by the second server, arbitration of one or more states between the first server and the second server and detect, by the arbiter executed by the second server, a failure of the first server based on the arbitration of the one or more states between the first server and the second server. In response to detecting the failure of the first server, the instructions can further cause the one or more processors to provide, by the second server, to a load balancer of the cloud-based environment, a health status message providing a health status for the second server, wherein the health status message initiates a failover from the first server to the second server. Providing, by the second server, to a load balancer of the cloud-based environment, the health status message in response to detecting the failure of the first server can comprise providing a health status indicating a healthy status for the second server. In some cases, the instructions can further cause the one or more processors to, in response to detecting the failure of the first server, initiate, by the second server, an active mode warm-up process. The instructions can then further cause the one or more processors to, in response to detecting the failure of the first server, execute, by the second server, the one or more services of the cloud-based environment in the active mode.

BRIEF DESCRIPTION OF THE DRAWINGS

FIG. 6 is a flowchart illustrating additional details of an exemplary process for performing a failover in cloud-based environment according to one embodiment of the present disclosure In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C" "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
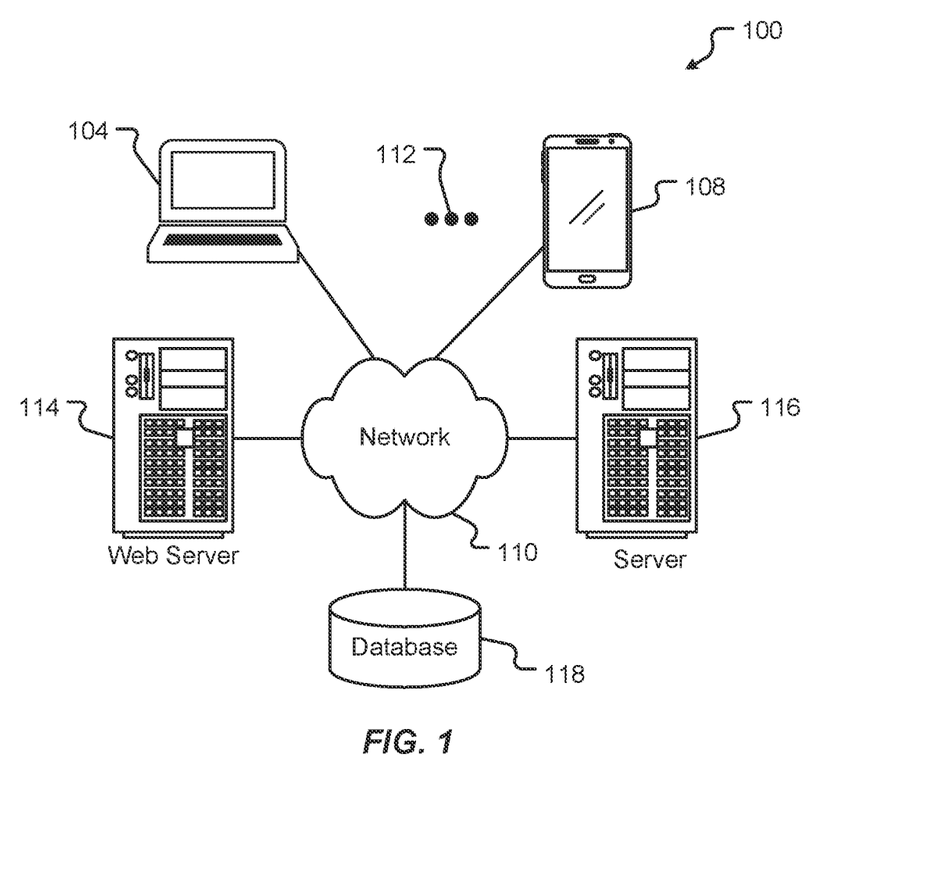
FIG. 1 is a block diagram illustrating elements of an exemplary computing environment in which embodiments of the present disclosure may be implemented.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices

104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
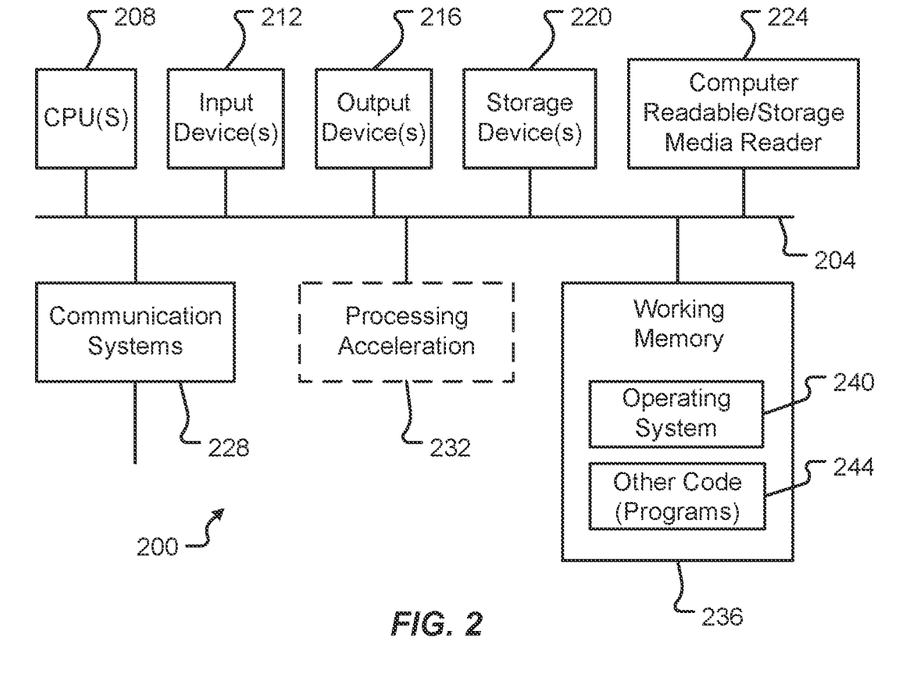
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Embodiments of the disclosure provide systems and methods for performing a rapid failover in a cloud-based service with reduced interruption of ongoing communications. As will be described below, independent arbitration between servers can be used to indicate to a load balancer which of two or more servers should be considered the active one. This independent arbitration makes better state of health assessments than simple server failure. The load balancer is explicitly controlled in this case. The health of individual containers, the completeness of the shadowed state as well as server health itself can all be factored into the decision to make one server active over the other.

Figure 3:
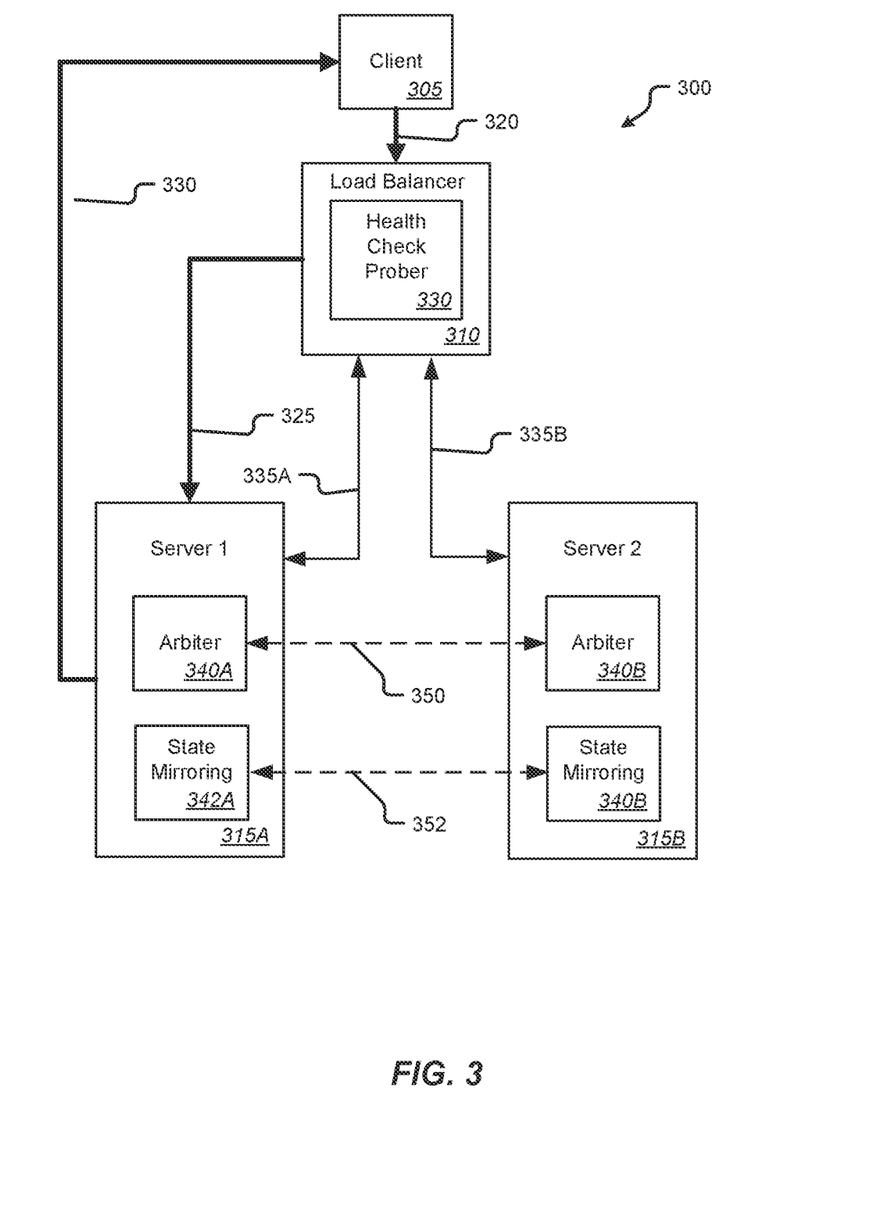
FIG. 3 is a block diagram illustrating elements of an exemplary cloud-based environment in which embodiments of the present disclosure may be implemented.

FIG. 3 is a block diagram illustrating elements of an exemplary cloud-based environment in which embodiments of the present disclosure may be implemented. As illustrated in this example, the environment 300 can include one or more client device(s) 305 such as a personal computer, mobile device, telephone, or any other computing or communication device as described above. The client device 305 can communicate with a load balancer 310 of the environment through one or more wired and/or wireless communications networks (not shown here) as described above. The environment 300 can further include a plurality of servers 315A and 315B such as any of the servers described above. The servers 315A and 315B can provide any of a variety of services of the cloud-based environment 300. In one example, the servers 315A and 315B can provide a Contact Center as a Service (CCaaS) framework. Generally speaking, and as known in the art, the load balancer 310 can receive a communication 320 such as a media stream, for example, from the client device 305 and route the incoming stream 325 or other data to one of the servers 315A. The server 315A can then rely to the client device 305 with an outgoing stream 330 or other data.

As known in the art, the load balancer 310 can periodically request and receive from each server 315A and 315B health status information 335A and 335B. For example, the load balancer 310 can send a health check probe to each server 315A and 315B which can in turn reply with an indication that the server 315A and 315B is healthy, e.g., a HyperText Protocol (HTTP) 200 code, or unhealthy/unavailable, e.g., an HTTP 503 code. Based on these replies, the load balancer 310 can route the incoming stream 325 or other data to an available server 315A rather than an unavailable server 315B Each server 315A and 315B can also include an arbiter 340A and 340B. As known in the art, an arbiter 340A and 340B can comprise software executed by each server 315A and 315B which exchanges state information 350 between the servers 315A and 315B. The status information can include state information for these applications as well as health status information for the servers 315A and 315B. The servers 315A and 315B may provide services, e.g., cloud-based CCaaS services, in which high availability is important. In such cases, applications and data, i.e., memory and state, can be replicated 352 between the servers 315A and 315B by mirroring components 342A and 342B as known in the art and based on which server 315A or 315B is selected as the active server 315A and standby server 315B by the arbiters 340A and 340B.

According to one embodiment, the arbiters 340A and 340B can be further adapted to select or set an active server 315A and a standby server 315B based on the exchanged state information 350. For example, the arbiter 340A of the active server 315A can cause the server 315A to provide health status information 335A indicating this active status, e.g., provide a healthy status indication such as an HTTP 200 reply to a health status probe by the load balancer 310. Similarly, the arbiter 340B of the standby server 315B can cause the server 315B to provide health status information 335B indicating this standby status, e.g., an HTTP 503 reply to a health status probe by the load balancer 305. A failover from the active server 315A to the standby server 315B can also be accomplished by the arbiters 3140A and 340B. For example, if the arbiter 340B of the standby server 315B detects a failure or other problem in the state information 350 received from the active server 315B, it can cause the standby server 315 to switch to an active mode and send a healthy status message or other indication of availability to the load balancer 310 causing the load balancer 310 to begin routing the incoming data stream 325 to the on active, but previously standby, server 315B while the arbiter 340A of the previously active server 315A can cause the server 315A to send an unhealthy status message or other indication of availability to the load balancer 310. In response, or in response to lack of reply to a health status probe in the event of a complete failure of the server 315A, the load balancer 310 can stop routing the incoming data stream 325 to the previously active server 315A.

Since the state is already in memory of the standby server 315B, this approach allows the standby server 315B to very quickly take over without having to be copied from an external state store which would delay service. Which server 315A or 315B is active can be decided by the arbiters 340A and 340B very quickly (normally within 250 ms). Since load balancers rely on socket probes to each server 315A and 315B and answers back to determine to which server traffic should be routed do not change their routes quickly. Usually, these probes are sent in intervals of seconds instead of milliseconds. Since the arbiters 340A and 340B contain logic and functionality to monitor the state of health of each server 315A and 315B, they can detect a failure within milliseconds and initiate a failover much more quickly than the load balancer 310 alone can accomplish. The client device(s) 305 can quickly reconnect to the IP address of the load balancer 310, which in turn forwards traffic to the newly active server 315B and a loss in media is not or only slightly noticeable.

Stated another way, performing a failover between a first, i.e., active, server 315A and a second, i.e., standby. Server 315B in a cloud-based environment 300 can comprise executing, by the first server 315A, one or more services in the cloud-based environment 300 in an active mode and executing, by the second server 315B, the one or more services in the cloud-based environment 300 in a standby mode. While executing the one or more services in the cloud-based environment 300 in the active mode, the first server 315A can provide a health signal 335A to the load balancer 310 of the cloud-based environment 300 indicating a healthy state for the first server 300. While executing the one or more services in the cloud-based environment 300 in the standby mode, the second server 315B can provide a health signal 335B to the load balancer 310 of the cloud-based environment indicating an unhealthy state for the second server 315B.

An arbiter 340A executed by the first server 315B and an arbiter 340B executed by the second server 315B can also perform arbitration of one or more states between the first server 315A and the second server 315B. The first server 315A and the second server 315B can further perform memory and state replication 352 from the first server 315A to the second server 315B. Based on the arbitration of the one or more states between the first server 315A and the second server 315B, the arbiter 340B executed by the second server 315B can detect a failure of the first server 315B.

In response to detecting the failure of the first server 315A, the second server 315B can provide, to the load balancer 310 of the cloud-based environment 300, a health status message 335B providing a health status for the second server 315B, wherein the health status message 335B initiates a failover from the first server 315A to the second server 315B. In some cases, the second server 315B can initiate an active mode warm-up process in response to detecting the failure of the first server 315A. Providing the health status message 335B in response to detecting the failure of the first server 315A can comprise providing a health status indicating a healthy or available status for the second server 315B.

The one or more services of the cloud-based environment can then be executed in the active mode by the second server 315B.

Figure 4:
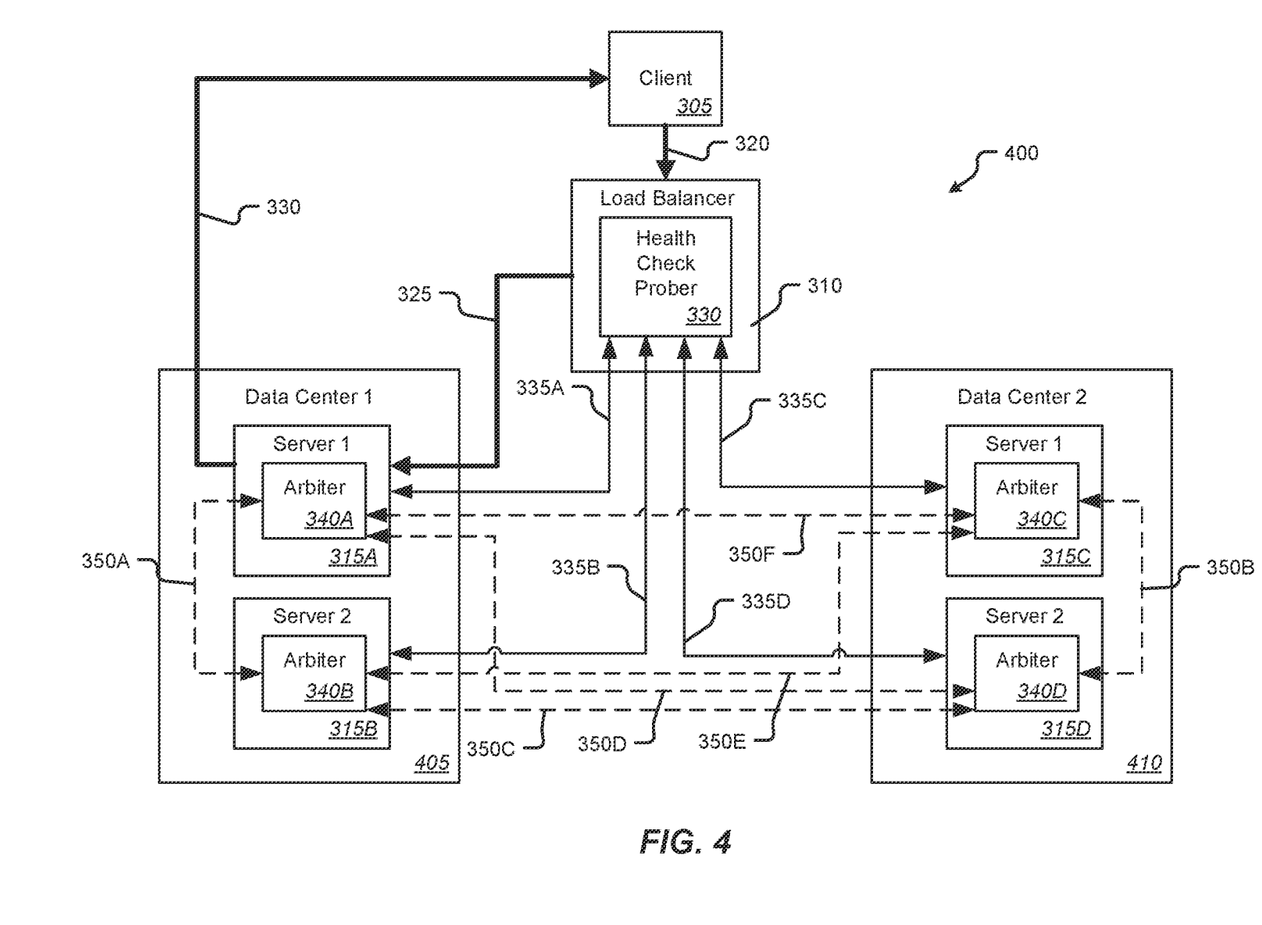
FIG. 4 is a block diagram illustrating additional elements of an exemplary cloud-based environment in which embodiments of the present disclosure may be implemented.

It should be noted that while described above with reference to only two servers 315A and 315B for the sake of clarity, any number of additional servers may be used in various implementations FIG. 4 is a block diagram illustrating additional elements of an exemplary cloud-based environment in which embodiments of the present disclosure may be implemented. More specifically, this example illustrates a cloud-based environment 400 in which servers 315A-315D are distributed between a plurality of data centers 405 and 410 which may be in different geographic locations for the sake of improved disaster avoidance. In this case, any of the servers 315A-315D can be made the active server. As with the previous example, each server 315A-315D can execute an arbiter 340A-340D which can perform the functions described above including performing a failover from an active server 315A to one of the other, standby servers 315B-315D based on state information 350A-350F exchanged between the arbiters 340A-340D and health status messages 335A-335D between the servers 315A-315D and the load balancer 310.

Figure 5:
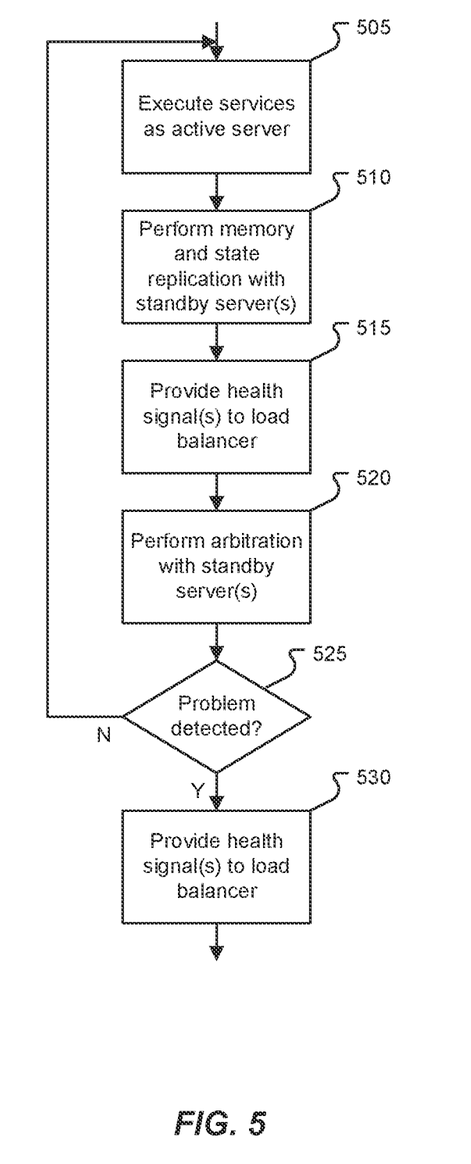
FIG. 5 is a flowchart illustrating an exemplary process for performing a failover in a cloud-based environment according to one embodiment of the present disclosure.

FIG. 5 is a flowchart illustrating an exemplary process for performing a failover in a cloud-based environment according to one embodiment of the present disclosure. More specifically, this example illustrates processes as my be performed by an initially active first server 315A as described above. As illustrated in this example, performing a failover between a first server and a second server in a cloud-based environment can comprise executing 505, by the first server, one or more services in the cloud-based environment in an active mode. The first server can also perform 510 memory and state replication from the first server to the second server. While executing 505 the one or more services in the cloud-based environment in the active mode, the first server can provide 515 a health signal to the load balancer of the cloud-based environment indicating a healthy state for the first server.

An arbiter executed by the first server can perform 520 arbitration of one or more states between the first server and a second, standby server. If 525 no problems occur, the first server can continue to execute 505 the services as the active server, perform 510 memory and state replication, provide 515 a health signal to the load balancer indicating a healthy state, and performing 520 arbitration with the second server as described. If a determination 525 is made that a problem has occurred with the first server, i.e., a failure of the first server is detected based on the arbitration of the one or more states between the first server and the second server, and if the first server continues to execute in a state in which it is possible, the first server can provide 530 to the load balancer a health signal indicating an unhealthy or unavailable state.

Figure 6:
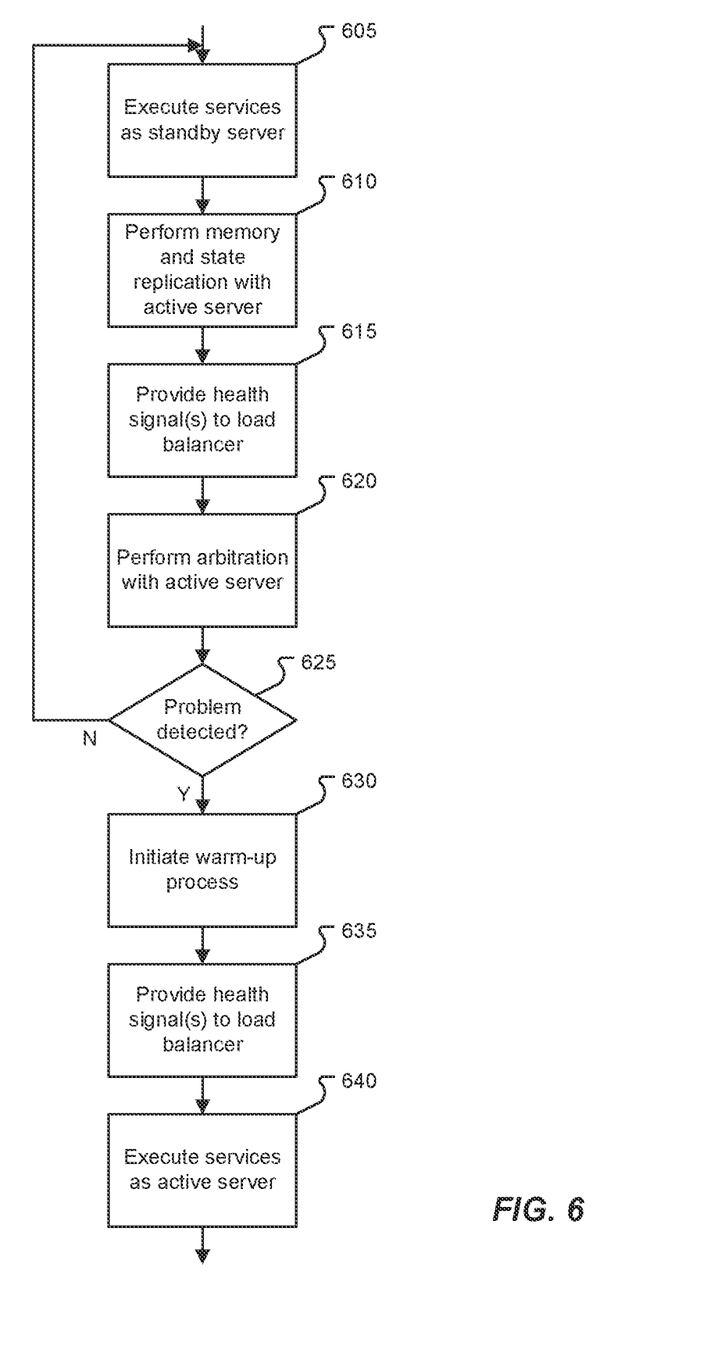

FIG. 6 is a flowchart illustrating additional details of an exemplary process for performing a failover in cloud-based environment according to one embodiment of the present disclosure. More specifically, this example illustrates processes as may be performed by an initially standby second server 315B as described above. As illustrated in this example, performing a failover between a first server and a second server in a cloud-based environment can comprise executing 605, by the second server, the one or more services in the cloud-based environment in a standby mode, performing 610 memory and state replication from the first server to the second server, providing 615, by the second server, a health signal to the load balancer of the cloud-based environment indicating an unhealthy or unavailable state for the second server, and performing 620, by the arbiter executed by the second server, arbitration of one or more states between the first server and the second server.

If 625 no problems occur, the second server can continue to execute 605 the services as the standby server, perform 610 memory and state replication, provide 615 a health signal to the load balancer indicating an unhealthy or unavailable state, and performing 620 arbitration with the first server as described. If a determination 625 is made that a problem has occurred with the first server, i.e., a failure of the first server is detected based on the arbitration of the one or more states between the first server and the second server, a failover can be performed. In some cases, an optional active mode warm-up process, e.g., sending a predetermined number of messages such as heartbeat signals, can be initiated 630 in response to detecting the failure of the first server. A health status message indicating a healthy or available status for the second server can be provided 635 to the load balancer and the one or more services of the cloud-based environment can be executed 640 by the second server in the active mode, i.e., as the active server.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for performing a failover between a first server and a second server in a cloud-based environment, the method comprising:
executing, by the first server, one or more streaming sessions in the cloud-based environment, wherein the first server executes the one or more streaming sessions in an active mode;
executing, by the second server, the one or more streaming sessions in the cloud-based environment, wherein the second server executes the one or more streaming sessions in a standby mode, wherein memory and state of the one or more streaming sessions are maintained between the active mode of the first server and the standby mode of the second server;
performing, by an arbiter executed by the first server and an arbiter executed by the second server, arbitration of a plurality of states between the first server and the second server;
detecting, by the arbiter executed by the second server, a failure of the first server based on the arbitration of the plurality of states between the first server and the second server; and
in response to detecting the failure of the first server, transitioning, by the second server, execution of the one or more streaming sessions from the standby mode to the active mode and providing, by the second server, to a load balancer of the cloud-based environment, a health status message providing a health status for the second server, wherein the health status message initiates a failover from the first server to the second server and wherein the failover from the first server to the second server is completed by the load balancer.

2. The method of claim 1, further comprising performing, by the first server and the second server, memory and state replication from the first server to the second server.

3. The method of claim 1, further comprising, while executing, by the first server, the one or more streaming sessions in the cloud-based environment in the active mode, providing, by the first server, a health signal to the load balancer of the cloud-based environment indicating a healthy state for the first server.

4. The method of claim 3, further comprising, while executing, by the second server, the one or more streaming sessions in the cloud-based environment in the standby mode, executing, by a third server, the one or more streaming sessions in the cloud-based environment in the standby mode, providing, by the second server, a health signal to the load balancer of the cloud-based environment indicating an unhealthy state for the second server, and providing, by the third server, a health signal to the load balancer of the cloud-based environment indicating an unhealthy state for the third server.

5. The method of claim 4, wherein providing, by the second server, to a load balancer of the cloud-based environment, the health status message in response to detecting the failure of the first server comprises providing a health status indicating a healthy status for the second server.

6. The method of claim 5, further comprising, in response to detecting the failure of the first server, initiating, by the second server, an active mode warm-up process.

7. The method of claim 5, further comprising, in response to detecting the failure of the first server, executing, by the second server, the one or more streaming sessions of the cloud-based environment in the active mode.

8. A cloud-based environment comprising:
a first server comprising a processor and a memory coupled with and readable by the processor of the first server and storing therein a set of instructions which, when executed by the processor of the first server, causes the processor of the first server to execute one or more streaming sessions of the cloud-based environment in an active mode; and
a second server communicatively coupled with the first server, the second server comprising a processor and a memory coupled with and readable by the processor of the second server and storing therein a set of instructions which, when executed by the processor of the second server, causes the second server to execute the one or more streaming sessions of the cloud-based environment in a standby mode, wherein memory and state of the one or more streaming sessions are maintained between the active mode of the first server and the standby mode of the second server, and wherein:
the set of instructions stored in the memory of the first server further causes the processor of the first server to execute an arbiter,
the set of instructions stored in the memory of the second server further causes the processor of the second server to execute an arbiter,
the arbiter executed by the processor of the first server and the arbiter executed by the processor of the second server perform arbitration of a plurality of states between the first server and the second server,
the set of instructions stored in the memory of the second server and executed by the processor of the second server further causes the processor of the second server to detect, based on performing the arbitration of the plurality of states between the first server and the second server, a failure of the first server, and in response to detecting the failure of the first server, transition execution of the one or more streaming sessions from the standby mode to the active mode and provide, to a load balancer of the cloud-based environment, a health status message providing a health status for the second server, wherein the health status message initiates a failover from the first server to the second server and wherein the failover from the first server to the second server is completed by the load balancer.

9. The cloud-based environment of claim 8, wherein the instructions stored in the memory of the first server and executed by the processor of the first server and the instructions stored in the memory of the second server and executed by the processor of the second server further cause the processor of the first server and the processor of the second server, memory and state replication from the first server to the second server.

10. The cloud-based environment of claim 8, wherein the set of instructions stored in the memory of the first server further cause the processor of the first server to, while executing the one or more streaming sessions in the cloud-based environment in the active mode, provide a health signal to the load balancer of the cloud-based environment indicating a healthy state for the first server.

11. The cloud-based environment of claim 10, wherein the set of instructions stored in the memory of the second server further cause the processor of the second server to, while executing the one or more streaming sessions in the cloud-based environment in the standby mode, provide a health signal to the load balancer of the cloud-based environment indicating an unhealthy state for the second server.

12. The cloud-based environment of claim 11, wherein providing, by the second server, to a load balancer of the cloud-based environment, the health status message in response to detecting the failure of the first server comprises providing a health status indicating a healthy status for the second server.

13. The cloud-based environment of claim 12, wherein the set of instructions stored in the memory of the second server further cause the processor of the second server to initiate an active mode warm-up process in response to detecting the failure of the first server.

14. The cloud-based environment of claim 12, wherein the set of instructions stored in the memory of the second server further cause the processor of the second server to, execute the one or more streaming sessions of the cloud-based environment in the active mode in response to detecting the failure of the first server.

15. A non-transitory, computer-readable medium comprising a set of instructions stored therein which, when executed by one or more processors, causes the one or more processors to perform a failover between a first server and a second server in a cloud-based environment by:
 executing, by the first server of a cloud-based environment, one or more streaming sessions in the cloud-based environment, wherein the first server executes the one or more streaming sessions in an active mode;
 executing, by the second server of the cloud-based environment, the one or more streaming sessions in the cloud-based environment, wherein the second server executes the one or more streaming sessions in a standby mode, wherein memory and state of the one or more streaming sessions are maintained between the active mode of the first server and the standby mode of the second server;
 performing, by an arbiter executed by the first server and an arbiter executed by the second server, arbitration of a plurality of states between the first server and the second server;
 detecting, by the arbiter executed by the second server, a failure of the first server based on the arbitration of the plurality of states between the first server and the second server; and
 in response to detecting the failure of the first server, transitioning, by the second server, execution of the one or more streaming sessions from the standby mode to the active mode and providing, by the second server, to a load balancer of the cloud-based environment, a health status message providing a health status for the second server, wherein the health status message initiates a failover from the first server to the second server and wherein the failover from the first server to the second server is completed by the load balancer.

16. The non-transitory, computer-readable medium of claim 15, wherein the instructions further cause the one or more processors to perform, by the first server and the second server, memory and state replication from the first server to the second server.

17. The non-transitory, computer-readable medium of claim 15, wherein the instructions further cause the one or more processors to, while executing, by the first server, the one or more streaming sessions in the cloud-based environment in the active mode, provide, by the first server, a health signal to the load balancer of the cloud-based environment indicating a healthy state for the first server and while executing, by the second server, the one or more streaming sessions in the cloud-based environment in the standby mode, provide, by the second server, a health signal to the load balancer of the cloud-based environment indicating an unhealthy state for the second server.

18. The non-transitory, computer-readable medium of claim 17, wherein providing, by the second server, to a load balancer of the cloud-based environment, the health status message in response to detecting the failure of the first server comprises providing a health status indicating a healthy status for the second server.

19. The non-transitory, computer-readable medium of claim 18, wherein the instructions further cause the one or more processors to, in response to detecting the failure of the first server, initiate, by the second server, an active mode warm-up process.

20. The non-transitory, computer-readable medium of claim 18, wherein the instructions further cause the one or more processors to, in response to detecting the failure of the first server, execute, by the second server, the one or more streaming sessions of the cloud-based environment in the active mode.

* * * * *